United States Patent
Liu et al.

(10) Patent No.: US 12,050,822 B2
(45) Date of Patent: Jul. 30, 2024

(54) ACCESS REQUEST RESPONSE METHOD, CONSUMABLE CHIP, AND STORAGE MEDIUM

(71) Applicant: Geehy Microelectronics Inc., Zhuhai (CN)

(72) Inventors: Weichen Liu, Zhuhai (CN); Liang Chen, Zhuhai (CN)

(73) Assignee: GEEHY MICROELECTRONICS INC., Zhuhai (CN)

( * ) Notice: Subject to any disclaimer, the term of this patent is extended or adjusted under 35 U.S.C. 154(b) by 0 days.

(21) Appl. No.: 18/147,667

(22) Filed: Dec. 28, 2022

(65) Prior Publication Data
US 2023/0135584 A1    May 4, 2023

Related U.S. Application Data

(63) Continuation of application No. PCT/CN2021/115132, filed on Aug. 27, 2021.

(51) Int. Cl.
G06F 3/12    (2006.01)

(52) U.S. Cl.
CPC ............ G06F 3/122 (2013.01); G06F 3/1229 (2013.01)

(58) Field of Classification Search
CPC ................................ G06F 3/122; G06F 3/1229
See application file for complete search history.

(56) References Cited

U.S. PATENT DOCUMENTS

| | | | |
|---|---|---|---|
| 6,622,205 B1* | 9/2003 | Weiss .................. | G11C 16/102 711/115 |
| 2007/0252858 A1* | 11/2007 | Kyoshima ............ | B41J 2/17513 347/7 |
| 2009/0073493 A1 | 3/2009 | Kuramochi | |
| 2014/0307015 A1* | 10/2014 | Nie ...................... | B41J 2/17543 347/5 |
| 2016/0288513 A1* | 10/2016 | Wang .................... | B41J 2/1753 |
| 2018/0224787 A1* | 8/2018 | Zhang .................... | G06F 13/00 |
| 2020/0257827 A1* | 8/2020 | Kounavis ............. | H04L 9/0637 |

FOREIGN PATENT DOCUMENTS

| | | |
|---|---|---|
| CN | 101436013 A | 5/2009 |
| CN | 101782739 A | 7/2010 |
| CN | 102166886 A | 8/2011 |

(Continued)

OTHER PUBLICATIONS

Jensen, Ted, "A Tutorial on Pointers and Arrays in C", Sep. 2003, Version 1.2, pages cited in Rejection. (Year: 2003).*

(Continued)

Primary Examiner — John R Wallace
(74) Attorney, Agent, or Firm — ANOVA LAW GROUP PLLC

(57) ABSTRACT

The present disclosure provides an access request response method, a consumable chip and a storage medium. The method includes receiving an access request sent by a printing device, the access request including address information; determining at least one second-type address in memory correspondingly according to the address information, a second-type address corresponding to at least two addresses in the address information; and responding to the access request through the at least one second-type address.

19 Claims, 5 Drawing Sheets

(56) References Cited

FOREIGN PATENT DOCUMENTS

| | | |
|---|---|---|
| CN | 103518193 A | 1/2014 |
| CN | 103802483 A | 5/2014 |
| CN | 109002400 A | 12/2018 |
| CN | 111737164 A | 10/2020 |

OTHER PUBLICATIONS

ISO/IEC 9899: TC3, "Committee Draft—Sep. 7, 2007", Sep. 7, 2007, WG14/N1256, pages cited in Rejection. (Year: 2007).*
The World Intellectual Property Organization (WIPO) International Search Report for PCT /CN2021/115132 Nov. 10, 2021 4 Pages (including translation).

\* cited by examiner

| Memory | |
|---|---|
| Address | Data |
| 0x00 | 0x10 |
| 0x01 | 0x11 |
| 0x02 | 0x12 |
| 0x03 | 0x12 |
| 0x04 | 0x12 |

FIG. 4

| Address comparison table | |
|---|---|
| Second-type address | Address in address information |
| 0x10 | 0x10-0x30 |
| 0x40 | 0x60-0xA0 |
| 0x80 | 0xF0-0xFF |

ACCESS REQUEST RESPONSE METHOD, CONSUMABLE CHIP, AND STORAGE MEDIUM

CROSS-REFERENCE TO RELATED APPLICATION

This application is a continuation application of PCT Patent Application No. PCT/CN2021/115132, filed on Aug. 27, 2021, which claims the priority to Chinese patent application No. 202010601893.0, filed on Jun. 29, 2020, in the China National Intellectual Property Administration, the entirety of all of which is incorporated herein by their reference.

TECHNICAL FIELD

The present disclosure generally relates to the field of print image-forming and office consumable technology and, more particularly, relates to an access request response method, a consumable chip, and a storage medium.

BACKGROUND

Printing devices are indispensable equipment in daily life. In the printing process, printing consumable cartridges, such as ink cartridges and toner cartridges, are needed. In order to record the use of the toner cartridge installed in the printing device, a detachable consumable chip, such as a toner cartridge chip, may be installed on the toner cartridge. The toner cartridge chip may be used to store relevant data of the toner cartridge, such as toner color, remaining toner amount, page output (the maximum quantity of printable pages), the quantity of printed pages, a manufacturer, a production date, a serial number and the like.

The consumable chip may be disposed on the consumable cartridge. The consumable chip may normally store data related to the consumable cartridge, such as color, capacity, area, service lifespan and the like. However, with personalization, customization and desirable results of printing, more configuration data may be stored in the consumable chip. For example, color preference information of local users may be stored in the consumable chip, and the printer may be configured by reading the information in the consumable chip to print out information that meets user preference. For another example, the consumable chip may store color configuration information for the consumable cartridge, and the printer may adjust the printer configuration through such information, which may accurately match current consumable cartridge and print optimal printing effect.

As more data are stored in the consumable chip, the consumable chip may need sufficient storage capacity to store such information. However, if a relatively large memory is configured on the consumable chip, the manufacturing cost of the consumable chip may be greatly increased. Since the consumable cartridge is a consumable, cost increase of the consumable chip may be significantly unfavorable to users.

SUMMARY

One aspect of the present disclosure provides an access request response method. The method includes receiving an access request sent by a printing device, the access request including address information; determining at least one second-type address in memory correspondingly according to the address information, a second-type address corresponding to at least two addresses in the address information; and responding to the access request through the at least one second-type address.

Another aspect of the present disclosure provides a consumable chip. The consumable chip includes a memory and a processor. The memory is configured with at least one second-type address. The processor is configured to receive an access request sent by a printing device, the access request including address information; determine at least one second-type address in the memory correspondingly according to the address information, a second-type address corresponding to at least two addresses in the address information; and respond to the access request through the at least one second-type address.

Another aspect of the present disclosure provides a non-transitory computer-readable storage medium. A computer program is stored on the storage medium; and when the computer program is executed by a processor, above-mentioned access request response method is implemented.

Another aspect of the present disclosure provides a consumable chip, detachably installed on a consumable cartridge. The consumable chip includes a memory including at least one second-type address, and the consumable chip uses data stored in the at least one second-type address to respond to an access request of a printing device for at least two addresses.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in the following description are merely some embodiments of the present disclosure. For those skilled in the art, other drawings may be obtained in accordance with these drawings without creative efforts.

FIG. 4 illustrates a schematic of an address configuration manner of an existing memory.

Figure 1:
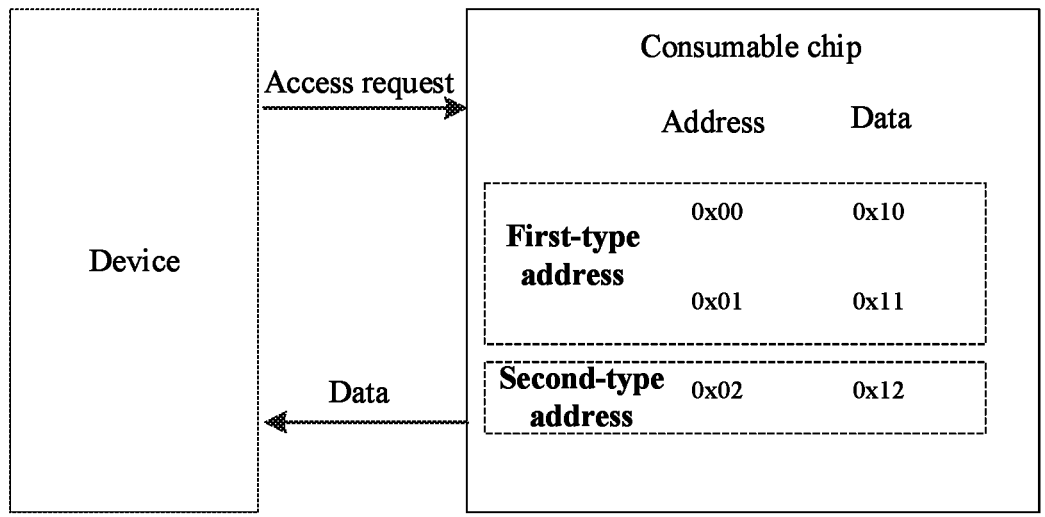
FIG. 1 illustrates a principal diagram of an application scenario according to exemplary embodiments of the present disclosure.

Certain embodiments of the present disclosure have been shown in above-mentioned drawings and are described in more detail hereinafter. These drawings and written description are not intended to limit the scope of the present disclosure in any way, but to illustrate the present disclosure for those skilled in the art by referring to specific embodiments.

DETAILED DESCRIPTION

In order to clearly describe objectives, technical solutions and advantages of embodiments of the present disclosure, the technical solutions in embodiments of the present disclosure may be clearly and completely described below in conjunction with the drawings in embodiments of the present disclosure. Obviously, described embodiments may be a part, rather than all, of embodiments of the present disclosure. Based on embodiments of the present disclosure, all other embodiments obtained by those skilled in the art without making creative efforts belong to the protection scope of the present disclosure.

The terms "first", "second", "third", "fourth" and the like (if any) in the description, claims and above-mentioned drawings of the present disclosure may be used to distinguish similar objects and may not necessarily describe a specific order or sequence. It should be understood that such data used may be interchangeable under appropriate circumstances, so that embodiments of the present disclosure described herein may, for example, be practiced in sequences other than those illustrated or described herein. Furthermore, the terms "comprise" and "include" as well as any variations thereof, may be intended to cover a non-exclusive inclusion. For example, a process, method, system, product or device including a series of steps or elements may not need to be limited to those steps or units explicitly listed but may include other steps or units which are not expressly listed or inherent to the process, method, product or apparatus.

The technical solutions of the present disclosure are described in detail below with specific embodiments. The following specific embodiments may be combined with each other, and same or similar concepts or processes may not be repetitive in some embodiments.

Printing devices are indispensable equipment in daily life. In the printing process, printing consumable cartridges, such as ink cartridges and toner cartridges, are needed. In order to record the use of the toner cartridge installed in the printing device, a detachable consumable chip, such as a toner cartridge chip, may be installed on the toner cartridge. The toner cartridge chip may be used to store relevant data of the toner cartridge, such as toner color, remaining toner amount, page output (the maximum quantity of printable pages), the quantity of printed pages, a manufacturer, a production date, a serial number and the like.

The consumable chip may be disposed on the consumable cartridge. The consumable chip may normally store data related to the consumable cartridge, such as color, capacity, area, service lifespan and the like. However, with personalization, customization and desirable results of printing, more configuration data may be stored in the consumable chip. For example, color preference information of local users may be stored in the consumable chip, and the printer may be configured by reading the information in the consumable chip to print out information that meets user preference. For another example, the consumable chip may store color configuration information for the consumable cartridge, and the printer may adjust the printer configuration through such information, which may accurately match current consumable cartridge and print optimal printing effect.

As more data are stored in the consumable chip, the consumable chip may need sufficient storage capacity to store such information. However, if a relatively large memory is configured on the consumable chip, the manufacturing cost of the consumable chip may be greatly increased. Since the consumable cartridge is a consumable, cost increase of the consumable chip may be significantly unfavorable to users.

To solve above-mentioned technical problems, the present disclosure provides an access request response method, a consumable chip, a printing device, and a storage medium, so that the printing device may obtain data information, which is larger than the storage space of the memory, from the memory, which may effectively reduce the storage space required by the memory in the consumable chip.

FIG. 1 illustrates a principal diagram of an application scenario according to exemplary embodiments of the present disclosure. As shown in FIG. 1, as a consumable, the consumable cartridge may be detachably installed on a printing device such as a printer, a copier, a 3D printer or the like. Various colourants or other materials may be stored in the consumable cartridge for usage. When the consumable cartridge is used on the printing device, such materials may continue to be consumed as the consumable cartridge is used on the printing device until such materials are exhausted. Consumable cartridges produced by different manufacturers may have different material properties in the consumable cartridges. In addition, users in different countries and regions may also have different requirements for the usage of consumable cartridges. Therefore, the consumable cartridge may be disposed with the consumable chip which is detachably installed on the consumable cartridge; and the memory in the consumable chip may store general information related to the consumable cartridge, such as color information, capacity information, production date, encrypted authentication, and the like. Meanwhile, the memory may also store configuration information that is used to configure the printing device. After the printing device obtains the configuration information, the printing device may be adjusted according to the configuration information, such that personalized user needs may be realized, and desirable usage of the consumable cartridge may also be ensured.

After the consumable cartridge is installed in the printing device, the consumable chip on the consumable cartridge may establish an electrical connection with the printing device and communicate with the printing device. When the printing device communicates with the consumable chip, the printing device may access the memory in the consumable chip by sending an access request containing address information. A general access request may include the access request type and the address information needs to be accessed. In the communication between the printing device and the consumable chip with encryption and verification, the access request may also include encryption information, verification information and the like. Such an access request may allow the printing device to randomly access data in the memory and access different addresses in the memory by changing the address information in the access request. The address information may be a specific address. For example, the address information (represented in hexadecimal) may be 0x00, 0x01, 0x02, 0x03, which indicates that four addresses 0x00-0x03 in the memory may need to be accessed, such that the address information may specify the range to be accessed. Also, the address information to be accessed may be indicated by means of the first address and data length. For example, the first byte in the address information may indicate the first address to be accessed, and the second byte may indicate the length of the address to be accessed. At this point, the address information may be that 0x00 and 0x03, which indicates that the access may start from address 0x00, and a total of 0x03 bytes may be accessed. That is, three addresses 0x00-0x02 in the memory may need to be accessed. Such manner may significantly reduce the length of the address information and optimize the communication process. No matter which address information indication manner is used, such manner is a communication manner that has been agreed between the memory and the printing device when being designed; and both the memory and the printing device need to follow such communication rules. No matter which address information indication manner is used, the address range specified by the address information may indicate the address region that the printing device wants to access. The access request of the printing device may be a read request, a write request, or other requests.

The memory in the consumable chip may be configured to include a plurality of first-type addresses, and at least one second-type address. For example, two addresses 0x00 and 0x01 of the memory may be configured as two first-type addresses, and the address 0x02 of the memory may be configured as the second-type address. The first-type address may correspond to only one address in the address information in the access request, and only respond to the access request of such one address. The consumable chip may respond to the access request of the printing device for a single address using the data stored in the first-type address. The second-type address may correspond to at least two addresses in the address information in the access request of the printing device and respond to the access request of at least two addresses. For example, two first-type addresses 0x00 and 0x01 may respectively correspond to address 0x00 and address 0x01 of the address information in the access request, and only respond to the access requests of address 0x00 and address 0x01 in the address information. That is, when the printing device accesses the consumable chip, if the address information in the access request is 0x00 address, the memory of the consumable chip may only have address 0x00 to respond to the access request; and if the address information in the access request is 0x01 address, the memory of the consumable chip may only respond with 0x01 address.

The address 0x02 of the memory of the consumable chip may be used as the second-type address, which may respond to the access requests of addresses 0x02 and 0x03 in the address information. When the address information in the access request of the printing device is address 0x02 or address 0x03, the address 0x02 of the memory may respond to both access requests. That is, when the printing device accesses address 0x02 and address 0x03 of the request memory, both responses obtained may be from the addresses 0x02 of the memory of the consumable chip. It can be seen that the consumable chip may respond to the access requests of the printing device to at least two different addresses 0x02 and 0x03 with the data stored in the second-type address 0x02, and the consumable chip may reply to the access requests for at least two different addresses 0x02 and 0x03 with same data (stored in the second-type address 0x02). In such way, it can be seen that two first-type addresses and one second-type address in the memory, a total of three addresses, may respond to the access requests of the printing device to access four addresses, and the address space of the memory may be less than the address space that the printing device can access. When the quantity of second-type addresses increases, or the quantity of addresses that each second-type address can respond to increases, the effect of saving memory space may become more obvious. By setting the second-type addresses in the memory, the printing device may obtain data information from the memory which is larger than the storage space of the memory.

Finally, the consumable chip may receive the access request sent from the printing device and determine at least one second-type address in the memory according to the address information, such that the access request may be responded to through the second-type address.

Applying above method may enable the address of the memory in the consumable chip to respond to access requests of at least two addresses, which realizes that the printing device may obtain data information larger than the storage space of the memory from the memory and effectively reduce the storage space required by the memory in the consumable chip.

The technical solution of the present disclosure and how the technical solution of the present application solves above-mentioned technical problems are described in detail below with embodiments. Following embodiments may be combined with each other, and same or similar concepts or processes may not be repetitive in some embodiments. Embodiments of the present disclosure are described below with reference to accompanying drawings.

Figure 2:
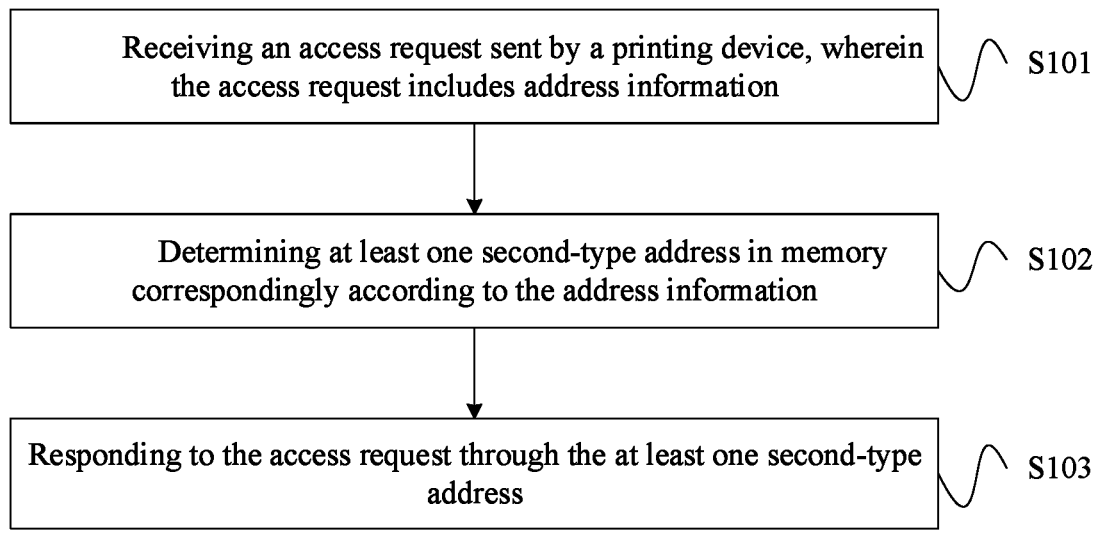
FIG. 2 illustrates a flowchart of an access request response method according to exemplary embodiment one of the present disclosure.

FIG. 2 illustrates a flowchart of an access request response method according to exemplary embodiment one of the present disclosure. Referring to FIG. 2, The method in one embodiment may include following exemplary steps.

At S101, the access request sent by the printing device may be received, where the access request may include address information.

In one embodiment, the consumable chip of the printer may receive the access request sent by the printing device, and the access request may include the address information.

At S102, at least one second-type address in the memory may be determined according to the address information.

In one embodiment, the consumable chip of the printer may search corresponding relationship between the address in the address information and the second-type address from the address comparison table; the address comparison table may include the mapping relationship between addresses, and the quantity of addresses corresponding to the second-type addresses; and according to the address comparison table, at least one second-type address corresponding to the address information in the memory may be determined. The second-type address may correspond to at least two addresses in the address information. The memory is described in detail in subsequent embodiments, which may not be described in detail herein.

At S103, the access request may be responded by using the second-type address.

In one embodiment, when there are N addresses corresponding to the second-type addresses in the address information, the access requests corresponding to the N addresses may be respectively responded to through the second-type addresses, where N is a natural number greater than 1.

In one embodiment, the access request sent by the printing device may be received, and the access request may include the address information; according to the range specified by the address information, at least one second-type address in the memory may be determined, where the second-type address may correspond to at least two addresses in the address information, and the range specified by the address information may include the at least two addresses; and the access request may be responded to through the second-type address. Therefore, the addresses of the memory in the consumable chip may respond to access requests of at least two addresses, which may make the printing device to obtain data information greater than the storage space of the memory from the memory and effectively reduce the storage space required by the memory in the consumable chip.

Figure 3:
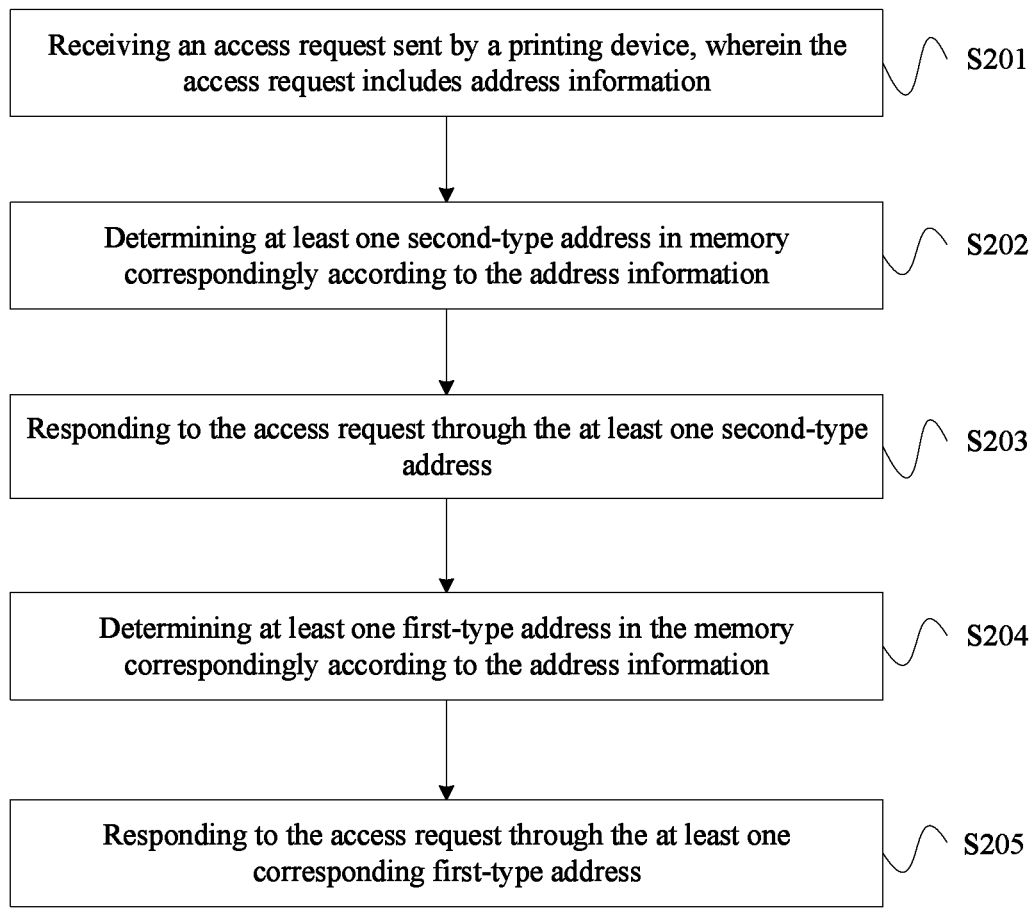
FIG. 3 illustrates a flowchart of an access request response method according to exemplary embodiment two of the present disclosure.

FIG. 3 illustrates a flowchart of an access request response method according to exemplary embodiment two of the present disclosure. Referring to FIG. 3, the method may include following exemplary steps.

At S201, the access request sent by the printing device may be received, where the access request may include the address information.

At S202, at least one second-type address in the memory may be determined according to the address information.

At S203, the access request may be responded through the second-type address.

In one embodiment, implementation process and technical principle of S201-S203 may refer to relevant description of S101-S103 in the method shown in FIG. 2, which may not be described in detail herein.

At S204, at least one corresponding first-type address in the memory may be determined according to the address information.

In one embodiment, the printer consumable chip may search corresponding relationship between the addresses in the address information and the first-type addresses from the address comparison table; and one first-type address corresponding to the address information in the memory may be determined according to the address comparison table. The first-type address may correspond to one address in the address information. In other embodiments, one-to-one corresponding relationship is between the first-type addresses and the addresses in the address information in the access request, such that the logic circuit or control program of the consumable chip may also directly respond to the access request according to originally set communication protocol/rule, without setting corresponding relationship for the first-type address in the address comparison table.

At S205, the access request may be responded through the first-type address.

In one embodiment, the printer consumable chip may respond to the access request of the printing device based on determined memory address corresponding to the address in the address information.

In one embodiment, the access request sent by the printing device may be received, and the access request may include the address information; according to the address information, at least one second-type address in the memory may be determined, where the second-type address may correspond to at least two addresses in the address information; and the access request may be responded to through the second-type address. Therefore, the addresses of the memory in the consumable chip may respond to access requests of at least two addresses, which may make the printing device to obtain data information greater than the storage space of the memory from the memory and effectively reduce the storage space required by the memory in the consumable chip.

Furthermore, in one embodiment, at least one corresponding first-type address in the memory may be determined according to the address information; and the access request may be responded through the first-type address. Therefore, the addresses of the memory in the consumable chip may respond to access requests of at least two addresses, which may make the printing device to obtain data information greater than the storage space of the memory from the memory and effectively reduce the storage space required by the memory in the consumable chip.

Figure 5:
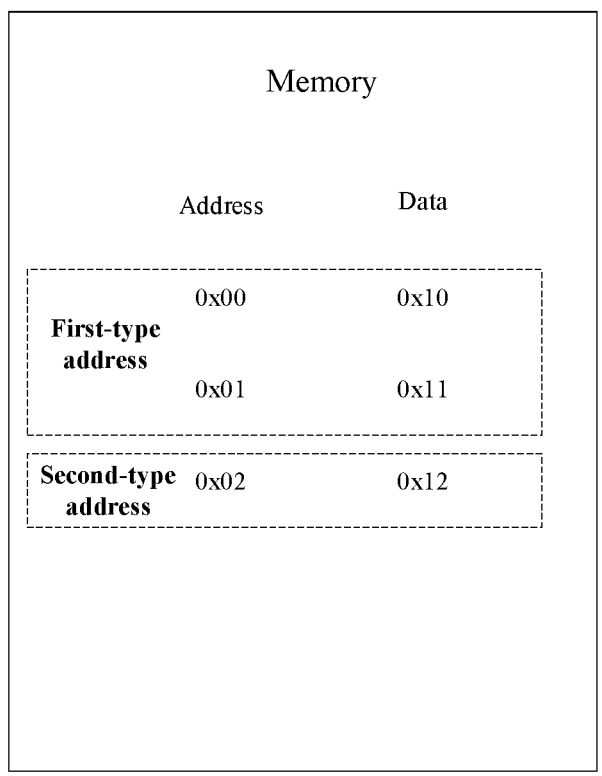
FIG. 5 illustrates a schematic of an address configuration manner of a memory according to exemplary embodiments of the present disclosure.

The second-type address in the memory may respond to multiple addresses in the address information in the access request, such that when the address accessed by the printing device corresponds to the second-type address of the memory, the printing device may actually access a same second-type address of the memory. Therefore, when the address accessed by the printing device corresponds to the second-type address of the memory, and the access request is a read request, the data read by the printing device may all be same. When designing the memory, multiple addresses that the printing device needs to read same data may correspond to one second-type address in the memory, and the address space of the memory may be less than the data space that the printing device needs to read, thereby reducing memory space. In existing memory design, if the printing device needs to access multiple addresses, multiple addresses must be configured in the memory. For example, FIG. 4 illustrates a schematic of an address configuration manner of an existing memory; and FIG. 5 illustrates a schematic of an address configuration manner of a memory according to exemplary embodiments of the present disclosure. Each address of the existing memory in FIG. 4 may uniquely respond to one address in the address information of the access request of the printing device. The printing device needs to access 5 addresses of the memory, such that 5 addresses may be configured in the memory to store data respectively. When the address information in the read request sent by the printing device is 0x00-0x04 addresses, each address in the memory may respond to the request once; and the data stored in memory addresses 0x00-0x04 may respond sequentially, and the printing device may read 5 pieces of data 0x10, 0x11, 0x12, 0x12 and 0x12 from the memory.

FIG. 5 illustrates a corresponding memory in embodiments of the present disclosure; the memory may include two first-type addresses, that is, 0x00 address and 0x01 address, and include one second-type address, that is, 0x02 address; and the address 0x02 of the second-type may correspond to the addresses 0x02-0x04 in the address information of the access request of the printing device and respond to the access requests of the addresses 0x02-0x04. When the address information in the read request of the printing device is addresses 0x00-0x04, two first-type addresses 0x00 and 0x01 of the memory may respond sequentially, the second-type address 0x02 of the memory may respond three times in a row, and the printing device may read 5 pieces of data 0x10, 0x11, 0x12, 0x12 and 0x12 from the memory. It can be seen that in the memory of the consumable chip in the present disclosure, the addresses with same data in multiple addresses may be configured as one second-type address, that is, three addresses 0x02-0x04 in the existing memory may be configured as one second-type address 0x02 of the memory in the present disclosure, which may greatly reduce the storage space and also satisfy the access request of the printing device to the memory. When the memory needs to store a large amount of repetitive data, the method of configuring the second-type address in the memory may effectively reduce the storage space. Especially, when the consumable chip stores a large amount of configuration information, the configuration information may be information read by the printer. During normal use of the consumable cartridge, such configuration information may be read-only data and may not be modified. The configuration information may be formed by data of multiple addresses, and the data of multiple addresses may be same. The second-type addresses may be configured in the memory, same data may be stored in the second-type addresses, and different data may be stored in the first-type addresses, which may effectively reduce the memory space.

In one embodiment, when the access request of the printing device is a write request, the first-type address in the memory may normally correspond to the address in the address information of the write request, and the data in the first-type address may be rewritten by the printing device. Obviously, the second-type address in the memory of the consumable chip may also correspond to multiple addresses in the address information of the write request. For example, the printing device may write data to some specific multiple addresses, but only the data of one of multiple addresses may be used as a reference, and the second-type address in the memory may correspond to such specific multiple addresses. When the printing device sends a write request for writing data to such specific multiple addresses, the second-type address in the memory may respond to the write request and write all of write data of the printing device to such specific multiple addresses into the second-type address.

It describes above that the second-type address may correspond to a continuous address segment in the address information of the access request of the printing device. In other embodiments, the second-type address may also correspond to discontinuous addresses (that is, discrete addresses) in the address information, which may not be described in detail herein. In above-mentioned embodiments, the case of only one second-type address is described. When there are multiple second-type addresses, same above-mentioned manner may be used to configure the relationship between multiple second-type addresses and the address information, which may not be described in detail herein.

When there are multiple second-type addresses, especially when multiple second-type addresses are continuous, multiple second-type addresses may be used as an address segment, one address segment may store a set of data, and such address segment may correspond to multiple addresses in the address information. For example, three second-type addresses including 0x02 address, 0x03 address and 0x04 address may be configured in the memory, and such three second-type addresses may be used as an address segment, that is, the 0x02-0x04 address segment; and such address segment as a whole may correspond to multiple address segments in the address information. For example, the address segment 0x02-0x04 may correspond to the address segment 0x05-0x07 and the address segment 0x10-0x12 in the address information. When the address information in the access request of the printing device includes the address segment 0x05-0x07 or the address segment 0x10-0x12, the address segment 0x02-0x04 of the second-type address may respond to the access request, and a set of data stored in the address segment 0x02-0x04 of the second-type address may be replied correspondingly. Such manner may effectively reduce the storage space when the memory needs to store multiple sets of repetitive data.

Figures 6, 7:
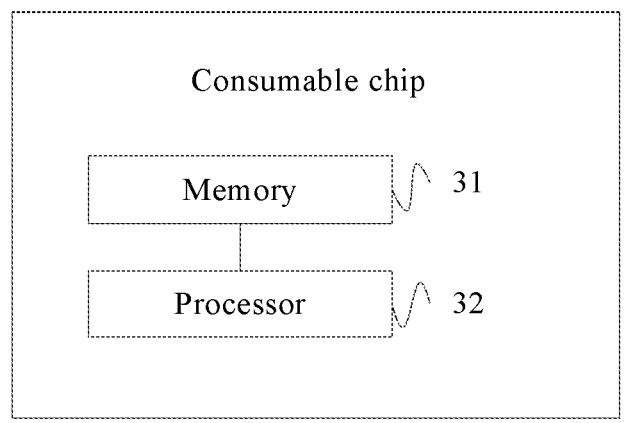
FIG. 6 illustrates a schematic of an address comparison table of a consumable chip according to exemplary embodiments of the present disclosure.
FIG. 7 illustrates a structural schematic of a consumable chip according to exemplary embodiment three of the present disclosure.

In order to better configure the second-type address, the consumable chip may also be configured with an address comparison table. The address comparison table may include the comparison relationship between multiple second-type addresses and multiple addresses in the address information, as shown in FIG. 6. When the printing device sends the access request to access the consumable chip, the consumable chip may determine the second-type address corresponding to the address information in the access request through the address comparison table. The communication process between the consumable chip and the printing device is described as follows. The printing device may send the access request containing the address information; after receiving the access request, the consumable chip may obtain the address in the address information and determine the address in the memory corresponding to the address in the address information according to the address comparison table; and correspondingly, the corresponding address of the second-type in memory may respond to the access request. In other embodiments, the address comparison table may also include the comparison relationship between the first-type addresses and the addresses in the address information.

The consumable chip in the present disclosure may have a processor. The processor may obtain the address in the address information of the access request, search the second-type address corresponding to the address in the address information according to the address comparison table, and then control the second-type address in the memory of the consumable chip to respond to the access request. The address comparison table may be stored in the memory or embedded in the control program of the processor. Both the read request and the write request of the printing device to the memory may also be completed under the control of the processor.

The address mentioned in the present disclosure may be an address in a unit of byte, or an address in a unit of bit.

The components of the data storage unit and the controller in above-mentioned embodiments may be directly or indirectly electrically connected to realize data transmission or interaction, for example, may be electrically connected to each other through one or more communication buses or signal lines.

FIG. 7 illustrates a structural schematic of a consumable chip according to exemplary embodiment three of the present disclosure. As shown in FIG. 7, the consumable chip may include a memory 31 and a processor 32. At least one second-type address may be configured in the memory, and information related to the consumable cartridge may be stored in the memory.

The processor 32 may be configured to receive the access request sent by the printing device, where the access request may include the address information; determine at least one second-type address in the memory according to the address information, where the second-type address may correspond to at least two addresses in the address information; and respond to the access request through the second-type address.

In an optional embodiment, at least one first-type address may be configured in the memory; and the processor 32 may further be configured to determine at least one first-type address in the memory correspondingly according to the address information, where the first-type address may correspond to one address in the address information; and respond to the access request through the second-type address.

In an optional embodiment, the processor 32 may be configured to, when there are N addresses corresponding to the second-type addresses in the address information, respectively respond to the access requests corresponding to the N addresses through the second-type addresses, where N is a natural number greater than 1.

In an optional embodiment, the second-type address may include an address in a unit of byte, or an address in a unit of bit.

In an optional embodiment, the second-type address may correspond to a continuous segment of addresses or discrete addresses.

In an optional embodiment, the data stored in the second-type address may be read-only data and configured to set the configuration information of the printer.

In an optional embodiment, the processor 32 may be configured to search corresponding relationship between the addresses in the address information and the second-type addresses from the address comparison table. The address comparison table may include the mapping relationship between addresses and the quantity of addresses corresponding to the second-type addresses.

According to the address comparison table, at least one second-type address corresponding to the address information in the memory may be determined.

The consumable chip provided in one embodiment may be used to implement the technical solution of the method embodiments shown in FIG. 2 and FIG. 3, which may have similar implementation principle and technical effect and may not be described in detail herein.

Embodiments of the present disclosure further provide a consumable chip. The consumable chip may be detachably installed on the consumable cartridge, and the consumable chip may include a memory including at least one second-type address, where information related to the consumable cartridge may be stored in the memory.

The consumable chip may respond to the access request of the printing device for at least two addresses using the data stored in the second-type address. The at least two addresses may be two different addresses. The consumable chip may further include the controller or the processor. How the consumable chip responds to the access request of the printing device may be controlled through the controller or processor.

In an optional embodiment, the access request received from the printing device may include the address information, and a range specified by the address information may include the at least two addresses.

In an optional embodiment, the consumable chip may reply to the access requests of the printing device for at least two different addresses using same data.

In an optional embodiment, at least two different addresses may be continuous addresses or discrete addresses.

In an optional embodiment, the configuration information used to configure the printing device, such as color configuration information, color calibration information, color packaging information, color compression information and the like, may be stored in the second-type address.

In an optional embodiment, the consumable chip may further include the first-type address; and the consumable chip may respond to an access request of the printing device for a single address using the data stored in the first-type address.

In one embodiment, the access request sent by the printing device may be received, and the access request may include the address information; according to the address information, at least one second-type address in the memory may be determined, where the second-type address may correspond to at least two addresses in the address information; and the access request may be responded to through the second-type address. Therefore, the addresses of the memory in the consumable chip may respond to access requests of at least two addresses, which may make the printing device to obtain data information greater than the storage space of the memory from the memory and effectively reduce the storage space required by the memory in the consumable chip.

Embodiments of the present disclosure further provide a printing device, including a consumable chip. The consumable chip may be installed in the consumable cartridge, and after the consumable chip establishes communication connection with the printing device, the consumable chip may execute above-mentioned access request response method.

Furthermore, embodiments of the present disclosure further provide a computer-readable storage medium, where computer-executable instructions may be stored in the computer-readable storage medium, and when at least one processor of the user equipment executes the computer-executable instructions, the user equipment may execute above-mentioned various possible methods.

Computer-readable media may include both computer storage media and communication media. The communication media includes any medium that facilitates transfer of a computer program from one location to another location. The storage media may be any available media that may be accessed by a general purpose or dedicated computer. An exemplary storage medium may be coupled to the processor, such that the processor may read information from and write information to the storage medium. Obviously, the storage medium may also be a component of the processor. The processor and storage medium may be located in ASIC (application-specific integrated circuit). Additionally, the ASIC may be located in the user equipment. Obviously, the processor and the storage medium may also exist in the communication device as discrete components.

Embodiments of the present disclosure further provide a program product including a computer program, where the computer program is stored in a readable storage medium, at least one processor of the server may read the computer program from the readable storage medium, and at least one processor may execute the computer program to enable the server to implement the method in any one of above-mentioned embodiments of the present disclosure.

From above-mentioned embodiments, it can be seen that the solutions according to the present disclosure may achieve at least following beneficial effects.

The present disclosure provides the access request response method, the consumable chip, the printing device and the storage medium. The access request sent by the printing device may be received, and the access request may include the address information; according to the address information, at least one second-type address in the memory may be determined, where the second-type address may correspond to at least two addresses in the address information; and the access request may be responded to through the second-type address. Therefore, the addresses of the memory in the consumable chip may respond to access requests of at least two addresses, which may make the printing device to obtain data information greater than the storage space of the memory from the memory and effectively reduce the storage space required by the memory in the consumable chip.

Those skilled in the art may understand that all or a part of the steps for implementing above-mentioned method embodiments may be completed by program instructions and related hardware. Above-mentioned program may be stored in a computer-readable storage medium. When being executed, the program may execute the steps including above-mentioned method embodiments; and above-mentioned storage medium may include ROM, RAM, magnetic disk or optical disk and other various media that may store program codes.

It should be noted that above-mentioned embodiments may be only used to illustrate the technical solutions of the present disclosure, rather than limit the present disclosure. Although the present disclosure has been described in detail with reference to above-mentioned embodiments, those skilled in the art should understand that the technical solutions described in above-mentioned embodiments may be modified or performed with equivalent replacements for some or all of the technical features. However, such modifications or replacements may not make the essence of corresponding technical solutions depart from the scope of the technical solutions of embodiments of the present disclosure.

What is claimed is:

1. An access request response method, comprising:
receiving an access request sent by a printing device, wherein the access request includes address information, wherein the address information includes a first byte and a second byte, the first byte indicates a first address to be accessed, and the second byte indicates a number of addresses to be accessed, starting from the first address;
determining at least one second-type address in a memory according to the address information, wherein the at least one second-type address corresponds to at least two addresses in the address information, and wherein the at least two addresses are represented in hexadecimal, and wherein data is included in the memory, and same data are configured for one second-type address in the at least one second-type address to correspond different addresses; and
responding to the access request through the at least one second-type address.

2. The method according to claim 1, further including:
determining at least one first-type address in the memory according to the address information, wherein a first-type address corresponds to one address in the address information; and
responding to the access request through the at least one first-type address.

3. The method according to claim 1, wherein responding to the access request through the at least one second-type address includes:
when N addresses in the address information correspond to the at least one second-type address, responding to the access request respectively according to the N addresses, wherein N is a natural number greater than 1.

4. The method according to claim 1, wherein the at least one second-type address includes an address in a unit of byte or in a unit of bit.

5. The method according to claim 1, wherein the at least one second-type address includes a continuous address segment or discrete addresses.

6. The method according to claim 1, wherein data stored in the second-type address is read-only data configured to set configuration information of the printing device.

7. The method according to claim 1, wherein determining the at least one second-type address in the memory includes:
determining the at least one second-type address according to an address comparison table.

8. A non-transitory computer-readable storage medium, wherein a computer program is stored on the storage medium; and when the computer program is executed by a processor, the access request response method according to claim 1 is implemented.

9. A consumable chip comprising:
a memory and a processor, wherein the memory is configured with at least one second-type address, and the processor is configured to:
receive an access request sent by a printing device, wherein the access request includes address information, wherein the address information includes a first byte and a second byte, the first byte indicates a first address to be accessed, and the second byte indicates a number of addresses to be accessed, starting from the first address;
determine at least one second-type address in a memory according to the address information, wherein the at least one second-type address corresponds to at least two addresses in the address information, wherein the at least two addresses are represented in hexadecimal, and wherein data is included in the memory, and same data are configured for one second-type address in the at least one second-type address to correspond different addresses; and
respond to the access request through the at least one second-type address.

10. The consumable chip according to claim 9, wherein the processor is further configured to:
determine at least one first-type address in the memory according to the address information, wherein a first-type address corresponds to one address in the address information; and
respond to the access request through the at least one first-type address.

11. The consumable chip according to claim 9, wherein the processor is further configured to:
when N addresses in the address information correspond to the at least one second-type address, responding to the access request respectively according to the N addresses, wherein N is a natural number greater than 1.

12. The consumable chip according to claim 9, wherein the at least one second-type address includes an address in a unit of byte or in a unit of bit.

13. The consumable chip according to claim 9, wherein the at least one second-type address includes a continuous address segment or discrete addresses.

14. The consumable chip according to claim 9, wherein data stored in the second-type address is read-only data configured to set configuration information of the printing device.

15. The consumable chip according to claim 9, wherein the processor is further configured to:
determine the at least one second-type address corresponding to the address information in the memory according to an address comparison table.

16. A consumable chip, detachably installed on a consumable cartridge, wherein the consumable chip includes a memory including at least one second-type address, and the consumable chip uses data stored in the at least one second-type address to respond to an access request of a printing device for at least two addresses, wherein the access request includes address information, and the address information includes a first byte and a second byte, the first byte indicates a first address to be accessed, and the second byte indicates a number of addresses to be accessed, starting from the first address, and wherein the at least two addresses are represented in hexadecimal, and wherein data is included in the memory, and same data are configured for one second-type address in the at least one second-type address to correspond different addresses.

17. The consumable chip according to claim 16, wherein:
the access request includes address information, and a range specified by the address information includes the at least two addresses.

18. The consumable chip according to claim 16, wherein:
the at least two addresses are continuous addresses or discrete addresses.

19. The consumable chip according to claim 16, wherein:
configuration information for setting the printing device is stored in the at least one second-type address.

* * * * *